April 12, 1955
E. LAVERDISSE
2,705,853
MEANS FOR MOVING A CONTINUOUS SHEET
OF GLASS IN GLASS SURFACING PLANTS
Filed Dec. 4, 1951
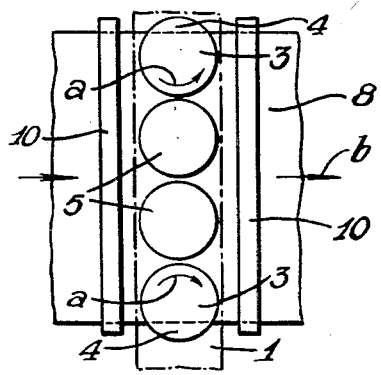
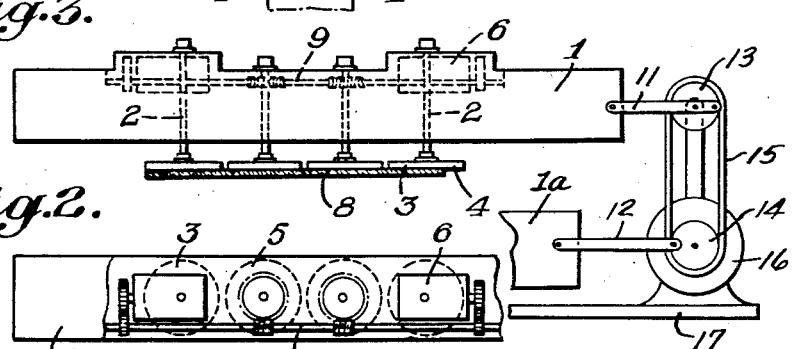
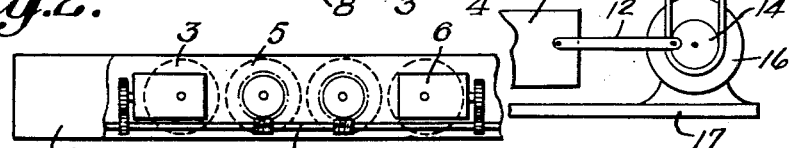
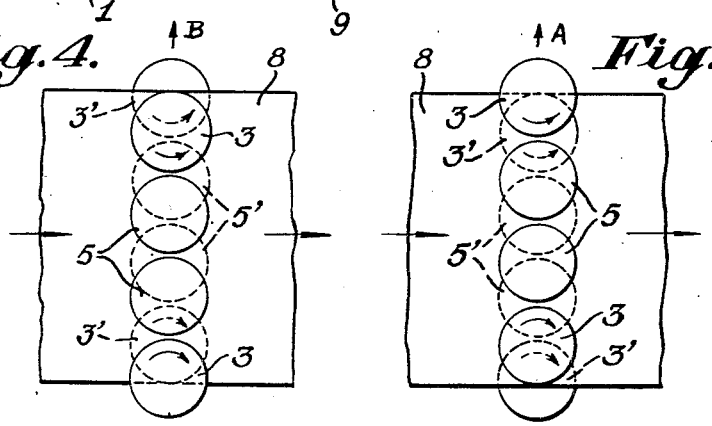
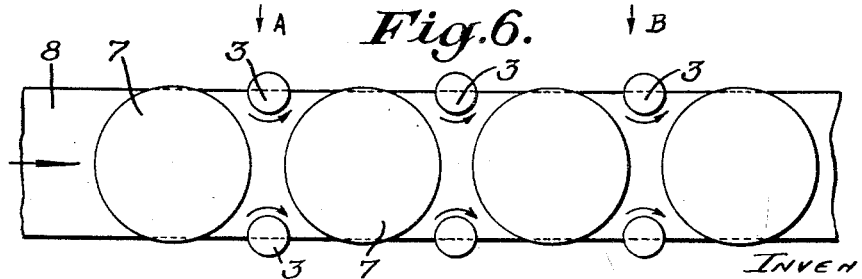
INVENTOR
EDMOND LAVERDISSE
BY:
Haseltine, Lake & Co.
AGENTS he# United States Patent Office 2,705,853
Patented Apr. 12, 1955

2,705,853

MEANS FOR MOVING A CONTINUOUS SHEET OF GLASS IN GLASS SURFACING PLANTS

Edmond Laverdisse, Auvelais, Belgium, assignor to Les Glaceries de la Sambre, Societe Anonyme, Auvelais, Belgium, a Belgian company Application December 4, 1951, Serial No. 259,802

Claims priority, application Belgium December 14, 1950

1 Claim. (Cl. 51—112)

In plants for surfacing, i. e. for grinding and/or polishing glass in form of a continuously moving endless band, the movement of the glass is usually imparted thereto by pairs of driving rollers inserted between successive grinding tools and between successive polishing tools. In both cases the pressure exerted by the tools acting either on one side, or simultaneously on both sides of the glass, has a braking effect that gives rise to very considerable internal stresses, capable of causing sometimes breakage of the glass.

It is an object of this invention to avoid this inconvenience and according to the invention this is attained by using the surfacing tools, i. e. the grinding or/and the polishing tools, to drive the endless glass sheet and, by varying the rotational speed of the marginal tools, to control or to regularise the forward motion of the sheet. To this end, surfacing tools are arranged across the side edges or margins of the glass sheet so that they project beyond said edges and variable speed driving means are provided for driving in opposite directions the tools projecting beyond opposite edges.

The arrangement according to the invention may be applied to plants of various existing types as those having rows of tools mounted on stationary or on reciprocating beams, and those having tools working over the whole width of the endless glass sheet, whether the surfacing operation be carried out successively or simultaneously on both sides of the sheet.

In the accompanying drawing illustrating by way of example a few embodiments of the invention:

Fig. 1 is a plan view showing a row of tools on a carrying beam.

Fig. 2 is a partial plan view with a portion thereof broken away showing a beam with tools arranged as illustrated in Fig. 1.

Fig. 3 is a partial side elevational view illustrating a modification of the invention.

Figs. 4 and 5 show diagrammatically the end positions of the rows of tools shown in Fig. 3.

Fig. 6 is a plan view showing another arrangement of tools.

In the arrangement as illustrated in Figs. 1 and 2, the beam 1 carries in a known manner four tools (for grinding or for polishing) each mounted for rotation on its axis 2. According to this invention, both outer or marginal tools 3 project beyond the edges of an endless glass sheet, they are rotated in opposite directions as shown by the arrows a and they cooperate in driving the endless glass sheet 8 in the direction of arrow b, as the portions 4 of these tools which would counteract the forward motion of the glass project laterally beyond and do not contact the glass. As to the intermediate tools, it is immaterial whether they rotate in one or in the other direction since their horizontal reactions on the glass mutually annul one another.

This arrangement may in some cases permit of dispensing with driving rollers, thereby saving space by enabling the beams to be placed closer to each other. It is of importance to control the rotation of the marginal tools by means of variable speed motors, such motors and their speed reductors being conventionally shown at 6 in Fig. 2.

It has been assumed in the drawing that the motors 6 rotating in unison drive a shaft 9 which by helical wheels and worms also drives the intermediate tools 5, but it will be obvious that the shaft 2 of each tool 3 or 5 may be driven separately.

Instead of projecting beyond the edges on both sides of the glass, the tools of cooperating or of successive beams may project alternately beyond one only of the edges, and then beyond the other. Thus, the modification of Figs. 3 to 5 show the extreme positions of the upper tools 3 and 5 and of the lower tools 3', 5' in a pair of beams 1 and 1a simultaneously working on both sides of the glass sheet 8 and mounted for reciprocation across the glass sheet. These movements bring alternately each of the marginal tools of each beam 1 or 1a partly beyond one edge of the sheet while the other marginal tool is in contact with the glass over its whole surface, see Figs. 4 and 5.

Means is provided for oppositely reciprocating the beams 1 and 1a and the tools 3—5 and 3'—5' carried thereby relative to the glass sheet 8. The reciprocating means comprises rods 11 and 12 pivotally connected at their ends to the beams 1 and 1a, see Fig. 2. The free ends of the rods 11 and 12 are pivotally connected respectively to rotatively supported wheels 13 and 14 which are connected by a drive belt 15 for rotation in synchronism. The wheel 14 is preferably carried by the driven shaft of a motor 16 mounted on the base 17 of the machine. The points of attachment of the rods 11 and 12 with the wheels 13 and 14 are diametrically offset to cause opposite reciprocation of the beams 1 and 1a.

In Figs. 4 and 5 arrows have been added with identifying letters A and B with the arrow A showing the direction of movement of the upper beam 1 and the arrow B showing the direction of movement of the lower beam 1a at a given moment.

Fig. 6 illustrates an arrangement where single or multiple working tools such as 7 occupy the whole width of the glass sheet, and small marginal tools 3 are inserted between the main working tools. While with the latter the horizontal reactions on the glass are annulled, the marginal tools are, as described above, driven in the proper directions to ensure the forward movement of the glass.

Other arrangements of the tools may of course be devised within the scope of the invention as defined by the following claim.

I claim:

An apparatus for surfacing both sides of a horizontal endless sheet of glass comprising upper and lower surfacing tools facing each other, said lower tools being adapted to support the glass sheet, pairs of reciprocating beams extending across said glass sheet, one beam of each pair carrying a set of upper tools and the lower beam of each pair carrying a set of lower tools, both said sets of tools comprising a marginal tool at each end of said beams, variable speed means for rotating said marginal tools in opposite directions, and means for oppositely reciprocating said beams so that a marginal tool on one beam in one pair projects beyond one edge of the glass sheet when a marginal tool on the other beam projects beyond the opposite edge of the glass sheet, thereby to equalize the driving forces at the two edges of the glass sheet.

References Cited in the file of this patent

UNITED STATES PATENTS

| | | |
|---|---|---|
| Re. 18,533 | Drake et al. | July 19, 1932 |
| 1,729,498 | Waldron | Sept. 24, 1929 |
| 1,803,752 | Ford | May 5, 1931 |
| 1,864,823 | Heuze | June 28, 1932 |
| 2,181,241 | Klemm | Nov. 28, 1939 |
| 2,272,651 | Waldron et al. | Feb. 10, 1942 |
| 2,304,974 | Waldron et al. | Dec. 15, 1942 |